(12) United States Patent
Bykov et al.

(10) Patent No.: US 8,326,948 B2
(45) Date of Patent: Dec. 4, 2012

(54) ABSTRACT PROTOCOL INDEPENDENT DATA BUS

(75) Inventors: Evgueni N. Bykov, Kenmore, WA (US); Alexander V. Netrebchenko, Sammamish, WA (US); Jon D. Bergevin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/715,400

(22) Filed: Mar. 2, 2010

(65) Prior Publication Data

US 2011/0219154 A1 Sep. 8, 2011

(51) Int. Cl.
*G06F 15/16* (2006.01)

(52) U.S. Cl. .................. 709/219; 709/201; 717/100

(58) Field of Classification Search ............. 709/217, 709/219, 218, 230; 717/100, 108, 106, 116, 717/118; 719/330, 331, 332; 710/105, 107
See application file for complete search history.

(56) References Cited

U.S. PATENT DOCUMENTS

| | | | |
|---|---|---|---|
| 7,783,717 B1 * | 8/2010 | Savchenko et al. | 709/217 |
| 2002/0013759 A1 * | 1/2002 | Stewart et al. | 705/37 |
| 2003/0070061 A1 | 4/2003 | Wong et al. | |
| 2005/0080635 A1 | 4/2005 | Groff et al. | |
| 2005/0155027 A1 | 7/2005 | Wei | |
| 2005/0246415 A1 * | 11/2005 | Belfiore et al. | 709/203 |
| 2005/0278348 A1 * | 12/2005 | Falter et al. | 707/100 |
| 2006/0277313 A1 | 12/2006 | Richer et al. | |
| 2008/0271059 A1 | 10/2008 | Ott et al. | |
| 2008/0306782 A1 | 12/2008 | Ephrati | |
| 2008/0313282 A1 | 12/2008 | Warila et al. | |
| 2009/0276730 A1 | 11/2009 | Aybes et al. | |

FOREIGN PATENT DOCUMENTS

| | | |
|---|---|---|
| WO | 2008013945 A2 | 1/2008 |
| WO | 2009143557 A1 | 12/2009 |

OTHER PUBLICATIONS

"International Search Report", Mailed Date: Nov. 16, 2011, Application No. PCT/US2011/026363, Filed Date: Feb. 25, 2011, 8 Pages.
Witt, et al., "The WUI-Toolkit: A Model-Driven UI Development Framework for Wearable User Interfaces", Retrieved at <<http://www.informatik.uni-bremen.de/~hwitt/data/witt07-iwsawc07.pdf>>, Proceedings of the 27th International Conference on Distributed Computing Systems Workshops, Jun. 22-29, 2007.
Mikhi, et al., "Cooperative Middleware Specialization for Service Oriented Architectures", Retrieved at <<http://www.iw3c2.org/WWW2004/docs/2p206.pdf>>, Proceedings of the 13th international World Wide Web conference on Alternate track papers & posters, May 19-21, 2004.

* cited by examiner

*Primary Examiner* — Frantz Jean (57) ABSTRACT

An abstraction layer (e.g., transport) between consumer logic (e.g., presentation) and provider logic (e.g., business) that makes composition of, for example, many presentation technologies to many business logic data providers possible without imposing strict interface boundaries to each. The abstraction layer can be an abstract transport data model bus that provides serialization, transformation, and transport services. A core concept of the data access library implementation is a transmittable data object based on a flexible property bag data structure and abstract type system. Pluggable data providers declare the associated data model, and pluggable consumer clients declare the data model consumed (a many-to-many implementation). In other words, declarative (codeless) combinations of front ends and back ends are employed. Moreover, the abstraction layer is hidden from the developer.

20 Claims, 9 Drawing Sheets

ABSTRACT PROTOCOL INDEPENDENT DATA BUS

BACKGROUND

In the development of user experience (UX) software the business logic code usually involves integration with the presentation code. As software techniques and technologies have evolved the notion of separating the business logic from the presentation was more appealing. More recently, systems usually have very distinct layers of separation between presentation and business logic. Although separated, these layers are in most cases still tightly coupled. Presentation is highly dependent on the business logic format, and business logic on the other end has to produce data in a specific form that the presentation logic can consume. The development of UX frameworks has evolved that requires data to be presented in a certain way, and data sources that present information, in a fixed way.

Existing presentation frameworks require data providers to conform to a strongly typed data model. Thus, the application layer or an intermediate layer needs to implement the serialization and transformation to conform to that model. Any modifications and extensions are compile time, rather than something that can be late bound at runtime.

There can be large investments in user training when employing a certain user interface (UI), for example, and as a result, data providers have to write intermediate layers to surface data in each of the popular UI widgets. Moreover, there can be similar investments data sources which need to be presented to different personas on different devices. For example, the UX provider has to write code to interface to the popular sources. The problems associated with exposing different business logic though a different UX, in any combination, become more and more daunting as systems evolve and become increasingly complex.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture creates an abstraction layer (e.g., transport) between consumer logic (e.g., presentation) and provider logic (e.g., business) that makes composition of, for example, many presentation technologies to many business logic data providers possible without imposing strict interface boundaries to each.

The abstraction layer can be an abstract transport data model bus that provides serialization, transformation, and transport services. A core concept of the data access library implementation is a transmittable data object based on a flexible property bag data structure and abstract type system. Pluggable data providers declare the associated data model, and pluggable consumer clients declare the data model consumed (a many-to-many implementation). In other words, declarative (codeless) combinations of front ends and back ends are employed. Moreover, the abstraction layer is hidden from the developer.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Unlike conventional approaches, the disclosed architecture provides an abstract data bus that normalizes the request pattern for data access by providing an abstraction that can vary depending on the requirements of the platform or the location of the client (corporate network versus remote intranet or Internet). The abstraction allows for varying implementations of the data bus. The abstract transport layer is completely hidden from the developer. Pluggable data providers declare corresponding data models, and pluggable consumers (e.g., presentation clients) declare the data models capable of consumption. Where the consumer is a presentation consumer, for example, data presentation is driven by a supplied data model strategy of the data provider.

The transport data model is a flexible, extensible, and standardized data access API and interface that supports multi-targeting user interface (UI) features, which enables the ability to connect to and retrieve/update data from various different providers. Customers and vendors can implement/test and deploy custom data providers that allow views and other controls in the UI to present and update, if desired.

The transport data model provides an easy way of exposing data that allows users to create providers that surface data to the UI ready for consumption using data binding. More complex provider methods can optionally be created with more detailed knowledge about the features of the data access API (application program interface) (also referred to as the protocol independent data bus).

In other words, the architecture defines and provides the data access API mechanism for accessing data for the view (UI) controls for cross platform functionality. The data access API is a set of interfaces and services that facilitate hosting a data model within the application. For data access, the objects exposed are transferrable, convertible, and bindable. In support thereof, a data object interface (e.g., IDataObject) is exposed to enable a control library and view models to consume the data exposed. The data object interface and a data model class (e.g., IDataModel) (factory, types cache) allows for objects to be exposed (e.g., by a CLR (common language runtime) class that acts as the provider).

Data exposed from data providers is transmittable through a transport layer. To facilitate development of custom data providers that can surface data into the UI, restrictions on serialization by the developers of providers is avoided by employing transmittable data objects. The transmittable data objects follow the same IDataObject interface that a provider returns, but allows the transfer of the data objects from customer-specific data types into a transmittable data object. Optionally, strongly typed data transfer objects can be used in the data providers. Thus, there is no specific interface imposed on the provider developer. Moreover, methods can have variable signatures, and can have aliases exposed as a custom attribute [DataCommand] that can take an optional (alias) name for the method. In addition each parameter on the method (command) can be aliased as well, in cases where the internal names of the parameters is desired to be hidden from the public API documentation for the command. Optionally, each parameter supports a converter that can convert the incoming parameter before the command is called.

Data consumers of the data access layer form-up commands and pass the commands to the provider engine by specifying a provider name chosen to handle the command. The command object also supports parameters, where the parameters can be any simple object (e.g., primitives and simple types like GUIDs, strings, bools, etc.), as well as strongly typed objects (as long as [DataContract] serializable).

Provider classes are allowed to be created and the classes can be marked with a custom data provider attribute class that indicates that this class hosts commands. To expose a method the provider (data) gateway engine can consume, a provider class decorated with the data provider attribute can declare methods that are decorated with a data command attribute class. The data command attribute class has a constructor that allows for the name of the command to be specified as a string. The name acts as an alias for the command and maps to the name of a command specified by the calling client code in the data command name property. Each command in the provider can also use a data command result attribute, which is optional, but when specified, maps to a class that implements a data converter interface (denoted IDataConverter). The data command result attribute indicates that the object needs to be converted using the converter specified in a converter type parameter for the constructor of the attribute.

By providing a converter, control is passed to the implementer of the converter to prepare the result. Thus, strongly typed classes can be returned from the provider command but go through a transformation (conversion) before being handed back through a gateway to the caller. The methods that are decorated in a data provider class can return any kind of object. In addition to server side conversion for results, the API supports client-side conversion. This abstraction allows for client-side converters to be implemented and then passed to the Command object. The engine handles calling the appropriate client-side converter if one is specified, allowing for conversion from one shape to another (target) shape if the developer and scenario requires it.

The disclosed architecture solves is the ability for the data access layer to actually reconstitute objects that are readily consumable by the UI layer. This means that after a call to the data access layer the results can be already in the form consumable by the UI, and in many cases, without additional processing.

Specifically, a data model represents an implementation of IDataModel and its supporting interfaces, IDataType, IDataProperty, IDataTypeCollection and IDataPropertyCollection. By allowing this abstraction a data provider simply uses the IDataModel interface to create instances of transmittable data objects that are defined by the developer of the data model. As long as the objects implement the interfaces the specific behavior of those objects within the business or UI tier can vary in infinite ways. In this way a request to the gateway (data bus) for a specific provider/command pair can result in an enumerable list of data objects.

An example of this implements a data model that exposed objects that supported two-way data binding by implementing an observer pattern, or if desired, implementing a Data Model that exposes objects that do not implement a specific observer pattern but conform to some other common interface as defined by the business requirements for those objects. Thus, the objects from the data layer are ready to data bind against with two-way binding, etc., in the UI tier. Typically, objects that implement an observer pattern are suited to presentation; however, observable objects are not required. If using the conversions (transformation) technique, any class that implements IDataModel, IDataObject, IDataType, IDataProperty, etc., can be passed into the provider engine and have the data model be used as the strategy for creating instances of IDataObject.

There are several data model interfaces defined herein to support both the internal infrastructural pieces for data access. These interfaces allow for concrete data models to be created that can manage the creation of objects that are "ready" to be consumed at the UI layer, and allow for intermediate data models that support serialization for transmission. There are also concrete classes supplied in a library for passing commands and context to methods implemented and explicitly (declaratively) exposed through custom data providers.

A provider engine is exposed that can register a provider by inspecting it (probing) to extract the provider "Name" (or alias) as well as all of the methods that are marked with the [DataCommand] attribute (indicating that the method is a command handler).

The engine is responsible for registering types and injecting any services into the provider. The registration of the provider occurs once per application domain and is persisted for additional calls down into the provider by the engine. The provider name is unique and matches the name of the provider that exists in the command. During the registration of the provider, if the provider already exists in a provider cache and the type for the provider is different than the provider already registered, an exception will be thrown and registration fails. However, the provider is instantiated for each command processed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
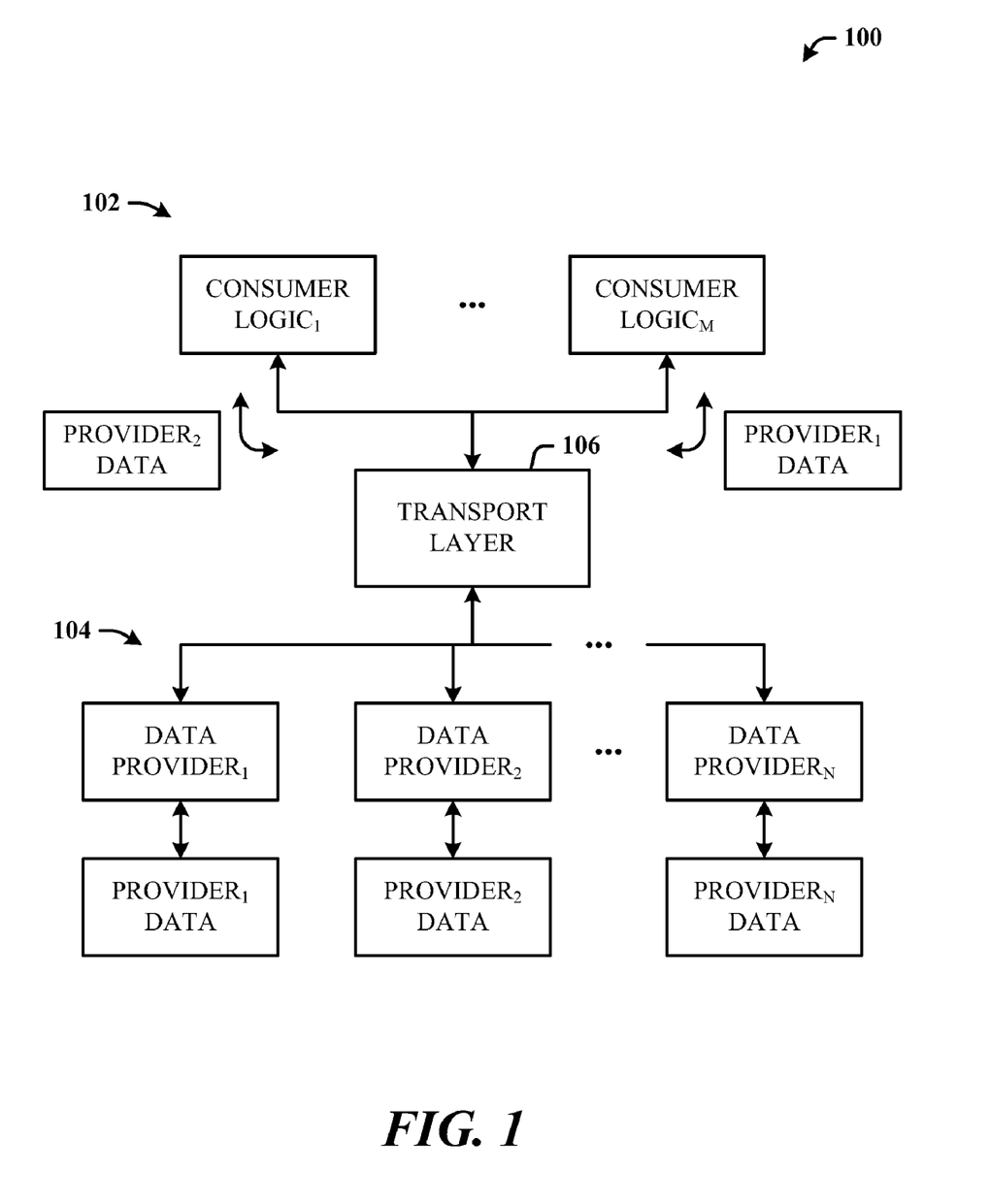
FIG. 1 illustrates a computer-implemented data bus system in accordance with the disclosed architecture.

FIG. 1 illustrates a computer-implemented data bus system 100 in accordance with the disclosed architecture. The system 100 includes consumer logic 102 that interacts with disparate data providers 104 for processing of provider data therefrom, and a transport layer 106 interstitial to the consumer logic 102 and the data providers 104 that provides protocol independent services for many-to-many handling of the provider data by the consumer logic 102.

The transport layer 106 provides serialization services, transformation services, and transport services that accommodate the disparate data providers 104. The transport layer 106 processes modifications and extensions that are bound at runtime. The transport layer 106 accommodates data providers 104 that are pluggable and declare associated data models. The transport layer 106 accommodates consumer logic 102 that is pluggable and declares an associated data model. The transport layer 106 accommodates declarative consumer logic 102 and data providers 104. The transport layer 106 accommodates data providers 102 that utilize methods having variable signatures. The transport layer 106 can also processes synchronous and asynchronous methods.

Figure 2:
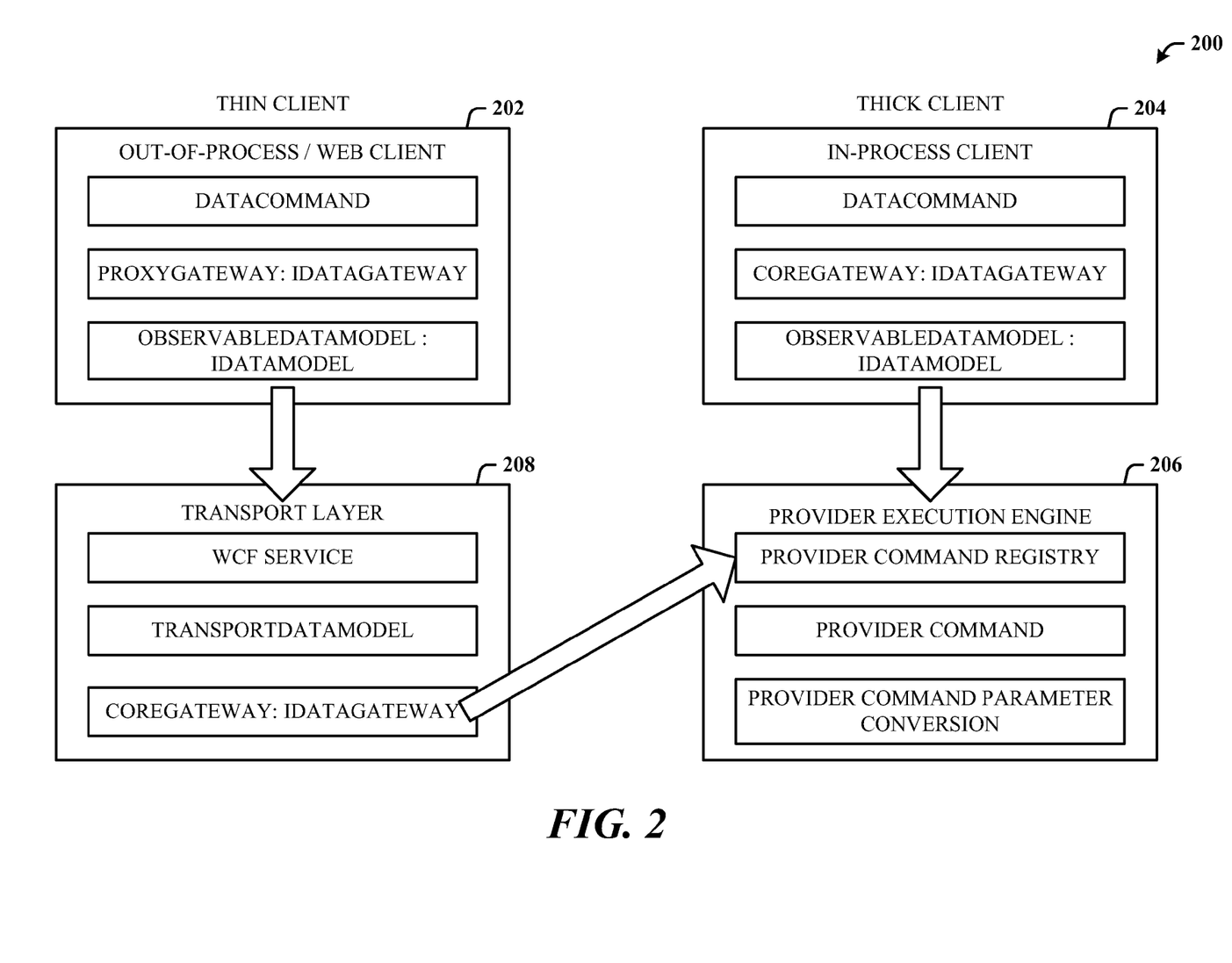
FIG. 2 illustrates a system of a thin client and a thick client interacting with a provider execution engine.

FIG. 2 illustrates a system 200 of a thin client 202 and a thick client 204 interacting with a provider execution engine 206. The system 200 is described in the context of the thin client utilizing WCF (Windows Communication Foundation™), a service oriented architecture. The thin client stack indicates the components involved in the web scenarios and a thick client stack indicates the components that are shared between the desktop and the service layer (e.g., WCF) for access to data.

With respect to the thin client 202, a data command gets exposed. Synchronous and asynchronous versions of the commands are provided. The command is also an abstraction that a user can implement in a customized way. When the command gets instantiated, it uses construction parameters. Rather than communicating to a concrete implementation of a proxy gateway, the thin client 202 requests a service called the IDataGateway. Once requested, the thin client 202 now has the interface needed to execute that command.

A data model is also provided and which is an optional construct. The data model is a strategy for how a data provider and a consuming client can get constructed objects that conform to an interface referred to as IDataObject. The data object is abstracted and is subject to opt-in or opt-out. In other words, as a data provider, the user can choose not to deal with strongly typed objects, with serialization, shared classes from client to client, etc. A data access library is provided based on a flexible property bag data structure (e.g., a persistent user control object containing values of user custom, extender and delegated properties) and abstract type system. In other words, the property bag is a flexible object that allows the transport of data from the data provider level back to the consumer client.

The clients are running in different domains. The thick client 204 runs on the desktop and the thin client 202 can run on any desktop but can actually run on the Internet. Thus, the transport layer abstraction (gateway bus) is protocol independent. If the command name and the parameters that the command accepts are known, the gateway bus is called and the data is obtained via the gateway bus. In this example, the thin client 202 uses a WCF protocol.

On the thick client 204, the IDataGateway is used as an implementation of a CoreDataGateway, which can execute a command against the execution engine 206 of the data provider, fetch the data, and transport the data back to the thick client 204.

The execution engine 206 includes a provider command registry. The registry is built up when the application domain is heated up. The registry scans one or more assemblies that have added markups. The provider command registry is hydrated, and commands are accessed from the command registry, which indicates the provider that holds the implementation.

Thus, a difference between the thin client 202 and thick client 204 is that the thin client uses the proxy gateway, which in turn makes an HTTP call, which in turn uses the same gateway as would be used if running the thick client 204.

A transport layer 208 is the layer that is responsible for serving up data and performing (executing) commands against the server for support of intranet and Internet scenarios. The transport layer 208 can comprise several components. In this particular example, data is transferred and commands executed through a WCF transport service. Additionally, the transport layer 208 is compatible with IDataObject and IDataModel. As indicated, the service can be exposed as a WCF service and provides all data transfer functionality across the network. The transport layer 208 defines a fault class for each of data access exceptions that may be thrown by the server. The fault exception can be converted back to the original exception thrown by the server on the client. This approach allows for the same codebase to be used for thick or thin client without having specific logic for a thin client platform. It unifies the client tier (consumer code) by hiding the serialization details for exceptions and data transmission.

Following is an example data flow description for the thick client 204 implementation described above. The core data gateway is the primary engine for accessing data, and provides functionality for the desktop as well as the web by allowing commands to be passed to it. The gateway uses the data command registry is employed for locating commands in the data providers. Once a given provider has been registered (e.g., during bootstrapping), the gateway (data bus) has what it needs to convert a fully qualified command name (FQCN) into a command method that can be invoked.

More specifically, the thick client 204 requests data by preparing a data command and passing the command to the core data gateway (protocol independent data bus). The gateway finds the method from the method registry, prepares the parameters, and invokes the method. Parameters are passed (converted to CLR parameters to the provider). If no data model is supplied with the call, the provider method is called. The provider returns the raw result to the gateway. The gateway then returns the raw result to the caller. If the data model is specified with a call into the gateway, the provider interacts with the data model. The data model result (IDataObject) is then returned to the gateway from the provider. The data model result is returned to the caller of the gateway method.

With respect to web data flow, the user wants to get back objects that are ready to data bind to directly in the UI. For this purpose an observable object data model is provided. The observable model implements the visitor pattern. The caller (thin client) knows the command to be called is IDataModel compatible (meaning that either IDataObject or IEnumerable<IDataObject> is returned). Initially, the view makes a request for data. The web application then asks for the service IDataGateway. Once the ProxyDataGateway instance has been located, a Execute(DataCommand comand, ObservableDataModel( )) method is called, passing in the data command and the client ObservableDataModel class.

Inside the implementation for the execute method, the ProxyDataGateway class performs the following. The proxy gateway converts the data command into a transport data command (similar to the data command, but constructed to lend itself to serialization), constructs an internal instance of the transport data model (the TransportDataModel supplies data contract serializable classes that implement the IData- Model interfaces), creates an instance of a web proxy class, and executes the web proxy client. The transport layer service activates.

On the server-side, the transport data command is converted (copied) back to a data command object. The service method (e.g., WCF) then asks for an instance of the CoreDataGateway class, a class registered in a container on the server that adheres to IDataGateway interface. Once the instance of the CoreDataGateway class has been established, the CoreDataGateway is called using an Execute(dataCommand, transportDataModel). The CoreDataGateway is responsible for locating the right method (command) in the right provider on the server. When the appropriate command/method has been located, the provider instance is created using the container to resolve the type into a concrete instance of the provider. The command registry is then used to fetch a command method object. A data command context instance is then created and handed to a provider base property. This ensures that each instance of a provider has the same context.

A command method is then called, passing in the instance of the provider, the operation context and the command parameters. The command method then resolves the parameters against the parameters that are required for the method. The command method also converts any of the input parameters to the proper types based on the optional parameter attribute converter and maps the input parameter names to the true names of the parameters for the method. The command method is then invoked and the result is obtained.

If a result converter is applied to the method/command the result is then passed to the result converter, and then handed back to the gateway. When the CoreDataGateway is finished executing, its results are passed back to the service in the transport layer 208. The service takes the result of the CoreDataGateway and constructs a transport result object to return to the ProxyDataGateway instance (invoked from the thin client 202). When the ProxyDataGateway gets back the transport result it evaluates to determine if the result is IDataObject or IEnumerable<IDataObject>. If either of these, then the input data model (the observable data model) is used to reconstruct the final result for the caller. When the call to the ProxyDataGateway finishes, the results from this call produce a single or enumerable list of IDataObject that are of type ObserverableObject, and thus, ready to bind to the UI directly (no more conversion required).

Following is a more detailed description of the data flow from the thin client 202 to the server. Note that essentially the data access functions the same and only differs when using a client-side data model. The thin client 202 requests data by forming up a data command and passing the command to the ProxyDataGateway. The ProxyDataGateway converts the data command into a transport data command, instantiates the proxy client class (e.g., WCF) and calls a method. For the raw mode, an Execute(TransportDataCommand) method can be used and for the DataModel mode, an ExecuteModel(TransportDataCommand) can be used.

The service (in the transport layer 208) gets the call and uses the service container to locate an instance of the CoreDataGateway (CoreDataGateway implements IDataGateway). The CoreDataGateway locates the command based on the fully qualified command name using the data provider command registry. The CoreDataGateway then registers an instance of the data command context class in a child container. Then the CoreDataGateway resolves an instance of the provider class. Finally, a data provider command method is called which performs parameter conversion and then invokes the method passing in the instance of the provider.

After the method has been invoked, the CoreDataGateway processes the results and hands the results back to the transport layer service. The service then prepares a transport result object from the command result received from the CoreDataGateway and hands the result object back to the ProxyDataGateway on the thin client 202.

The ProxyDataGateway receives the transport result from the call to the proxy object on the server. The ProxyDataGateway then analyzes the transport result, and if using the raw mode, hands the object back to the caller from the correct piece of the transport result. If using the data model, the transport result is evaluated to determine if the result holds an instance of a transport data object or a transport data object collection. If so, the client-side DataModel is applied to the results by converting the transport data object(s) into the target IDataObject form. If it does not see either of the types, an exception is thrown, indicating that the DataModel could not be applied due to an inconsistent return value from the call to the service. The data model transform is then returned to the client.

Figure 3:
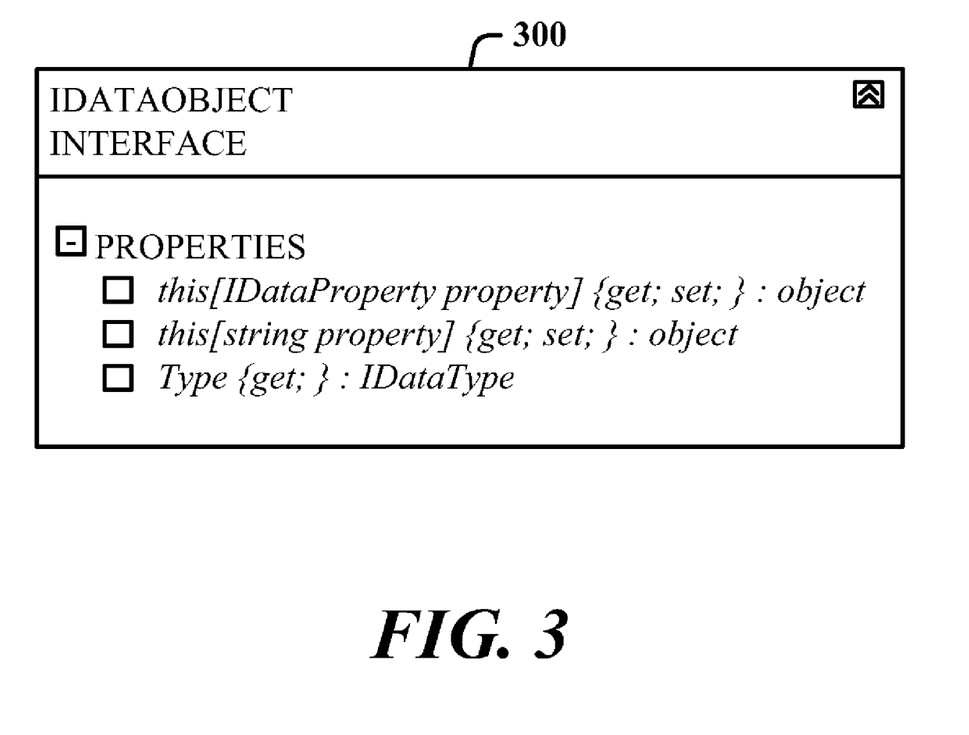
FIG. 3 illustrates an exemplary object interface of the transport layer.

FIG. 3 illustrates an exemplary object interface 300 of the transport layer. An interface 300 (denoted IDataObject) can be employed as the interface that defines the access for a given instance of an object. The interface 300 supports two indexor (item) properties—one property that takes an instance of an IDataProperty and another property that takes a string. In either case, the indexor (item) property is responsible for getting and setting the instance data for the instance of the class. Methods from providers can return either IDataObject or IEnumerable<IDataObject>, which when used in combination with a data model can be readily bound to the UI (view model) without any additional transformation. In some cases, the view model can include additional conversion to transform the IDataObjects into more complex structures such as trees and graphs.

Figure 4:
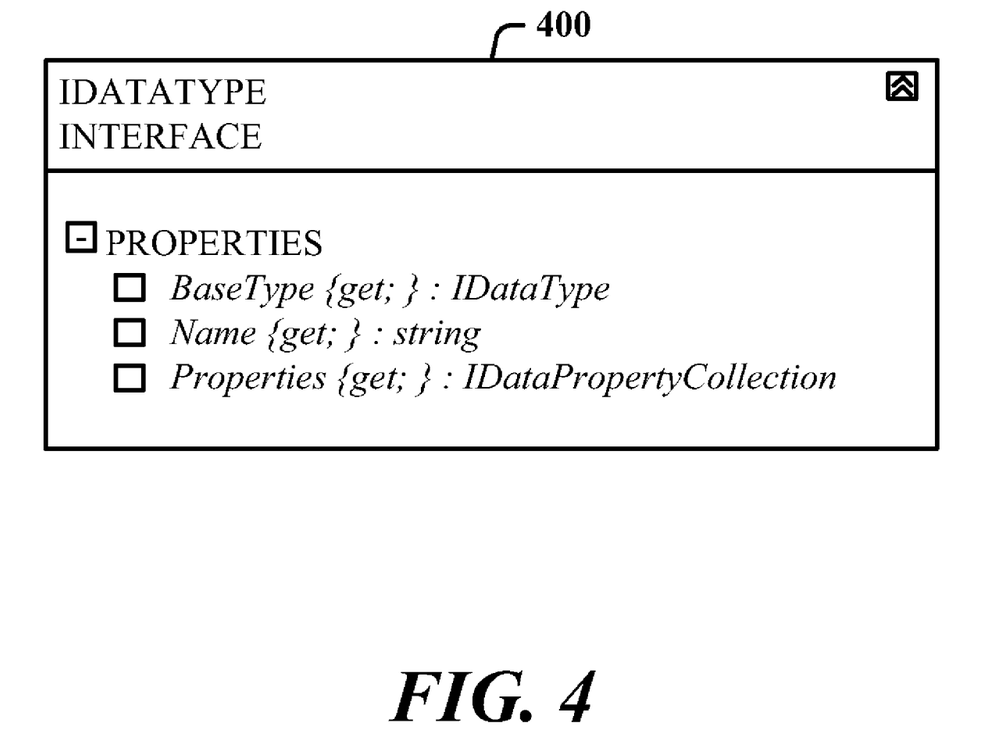
FIG. 4 illustrates an exemplary type interface of the transport layer.

FIG. 4 illustrates an exemplary type interface 400 of the transport layer. The type interface 400 (denoted IDataType) defines a type for a single object. The type exposes the properties for the given object. Type is used for binding loosely to objects that implement the interface. For each type defined in the data model a properties collection exists that allows for set/get operations against an individual property. Each property contains the "Name" of the property and internally holds the value for the property. The type interface 400 supports inheritance, expressed in a BaseType property of the interface 400. Depending on the scenarios (specifically the Type System) the BaseType can reflect the derivation chain of a type.

There is no specific interface imposed on the data provider developer. Methods can have variable signatures. Methods can have aliases exposed as a custom attribute (e.g., denoted DataCommand) that can take an optional (alias) name for the method. Methods (commands) can have various parameters and each parameter can have an alias as well as a converter.

Consumers of the transport layer 208 form up commands and pass these commands to the engine 206 by specifying the provider name to handle the command. The command parameters can be any simple object (primitives and simple types such as GUIDs, Strings, bools, etc.), IDataObjects, or strongly typed objects (as long as the objects are serializable (e.g., in DataContract).

Example

```
[DataProvider("AlertProvider")]
public class AlertProvider
{
   [DataCommand (Name = "GetAlert")]
   [return:
   DataCommandResult (typeof (MonitoringAlertToDataObjectConverter))
   ]
   public MonitoringAlert
   GetMonitoringAlert ([DataCommandParameter (Name="target")] Guid
   AlertId)
   {
      MonitoringAlert alert = // Logic to retrieve an alert
   from store
      return alert;
   }
}
```

The provider class can be marked with a data provider attribute. To expose a method that the data gateway engine can consume, a provider class decorated with the previously mentioned data provider attribute can declare methods that are decorated with the data command attribute. A command in the provider can also use a data command result attribute to indicate that the result object needs to be converted using the converter specified in a converter type parameter. The provider developer can optionally add a data command parameter attribute to the input parameter to indicate that a conversion should be done on the input parameter before invoking the actual method on the provider.

By exposing the concept of a converter, control is passed to the implementer of the data converter object on how conversion of the result of the command should occur. This allows for strongly typed classes to be returned from the provider command but go through a transformation (conversion) before being handed back through the gateway (data bus) to the caller.

While placing some restriction on the class(es) returned from data providers, these restrictions are less imposing. The data access layer now includes the ability to reconstitute objects that are readily consumable by the UI layer. Thus, after a call to the data access layer the results can already be in the form consumable by the UI, and in many cases, without additional processing. Using the transformation technique, any class that implements IDataModel, IDataObject, IDataType, IDataProperty, etc., can be passed into the engine and have the IDataModel be used as the strategy for creating instances of IDataObject.

Figure 5:
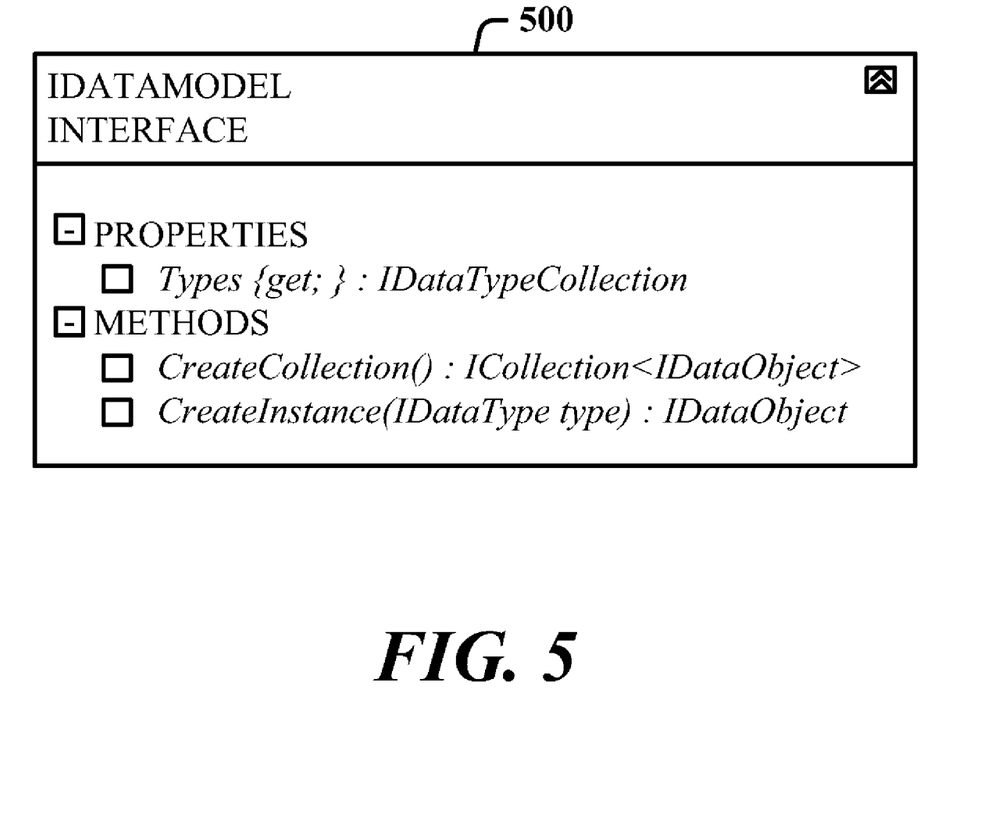
FIG. 5 illustrates an exemplary model interface that allows implementers to define classes that comprise the data model for consumption.

FIG. 5 illustrates an exemplary model interface 500 (denoted IDataModel) that allows implementers to define classes that comprise (make up) the data model for consumption. The model interface 500 acts as a strategy for creating instances of data object classes. Creators of data models can define a data model that deals with objects as instances of classes that are more suitable for the data consumer. An example of this can be defining a data model that creates instances of objects that are observable objects ready for view model (UI) consumption. By passing a concrete instance of an IDataModel to an Execute( )method on the gateway (data bus) the consumer can expect to get back a single instance or collection of instances of objects that are of type (e.g., ConcreteDataObject), where the concrete data object is of the type exposed by the data model. The model interface 500 is optional, and does not need to exist for a caller to get back data from the gateway; but in most cases, the data model interface 500 suits the needs of the callers by conforming the results to the data model expressed in the call.

The data model classes can consist of two groups: bindable object classes (e.g., BindableObject) and the transport data model classes (e.g., TransportDataModel). The bindable object model class and bindable class are considered client-side data model classes and exist so that observable collections and property changed notifications can be subscribed to for one or two-way binding in the UI.

Figure 6:
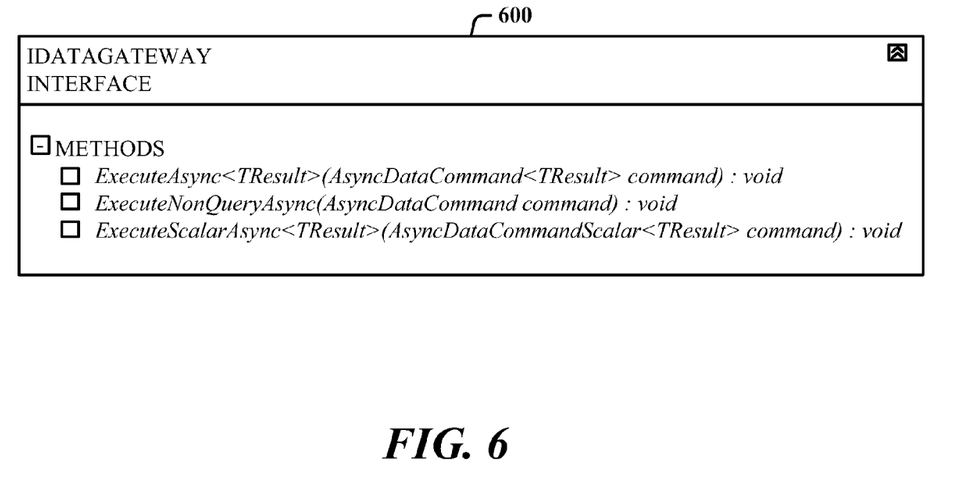
FIG. 6 illustrates a gateway interface that allows a concrete class to implement the interface.

FIG. 6 illustrates a gateway interface 600 (denoted IDataGateway) that allows a concrete class to implement the interface 600. (The gateway classes (proxy and core) are described as well above in FIG. 2.) The gateway interface 600 is an abstraction around the data access layer and exposes methods for passing commands to providers and getting results back. The gateway interface 600 interface supports both synchronous and asynchronous methods for execution of commands, following an asynchronous result pattern. The gateway abstraction utilizes two concrete classes: a core gateway and a proxy gateway. The core gateway (denoted CoreDataGateway) is used for a desktop console to access data from the provider. The proxy gateway (denoted ProxyDataGateway) is a concrete class that when implemented uses a proxy to a transport layer service that is responsible for exchanging data with the provider through a transport channel.

On the desktop (or server side), the core gateway is responsible for probing and storing metadata about a given provider. The probing is a procedure that is performed on a single provider type once per application domain and then cached to avoid extra reflection costs during normal execution of commands into the provider. The probing of the provider results in a provider name and the commands, converters, and methods supported. The core gateway implementation does not use a proxy, but interacts directly with the provider commands exposed through the provider registry.

The proxy gateway can be used for the thin client service and acts like a service agent. As illustrated in FIG. 2, that implementation contains an instance of the WCF proxy class and invokes execute methods on the proxy. To support the asynchronous pattern the proxy gateway relies on the asynchronous nature of the WCF service to perform asynchronous data commands.

Following is example code for implementing the disclosed protocol independent data bus (gateway).
1. Simple Type
   a. Client

```
DataCommandScalar<int> command =new
DataCommandScalar<int> ("AlertProvider.GetAlertsCount");
int alertCount = this.DataGateway.ExecuteScalar (command);
``` b. Provider

```
[DataProvider ("AlertProvider")]
public class AlertProvider
{
   [DataCommand]
   public int GetAlertCount ( )
   {
      int count = // logic to get alert count
      return count;
   }
}
```

2. List of Objects
a. Client

```
DataCommand<IDataObject> command = new
DataCommand<IDataObject> ("AlertProvider.GetAlerts",
    new ObservableDataModel( ));
IEnumerable<IDataObject> alerts = this.DataGateway.Execute (command);
``` b. Provider

```
[DataCommand]
[return:
DataCommandResult (typeof (MonitoringAlertToDataObjectConverter))]
public IList<MonitoringAlert> GetAlerts( )
{
    List<MonitoringAlert> alerts = // Logic to get alerts
    return alerts;
}
```

3. "Server Side" Parameter Conversion
a. Client

```
UIAlert uiAlert = new UIAlert( );
DataCommand cmd = new DataCommand ("AlertProvider.UpdateAlert");
cmd.Parameters["alert"] = uiAlert;
this.DataGateway.Execute(cmd);
``` b. Provider

```
[DataCommand (Name = "UpdateAlert")]
public void UpdateMonitoringAlert (
[DataCommandParameter (ConverterType=typeof (UIAlertTo
MonitoringAlertConverter))] MonitoringAlert alert)
{
    // Logic to update store based on a Monitoring Alert object
}
```

4. "Client Side" Converter
a. Client

```
    DataCommandScalar<UIAlert> command = new
    DataCommandScalar<UIAlert> ("AlertProvider.GetAlert",
        new TransportDataModel( ), new UiAlertClientConverter( ));
    command.Parameters.Add ("target", AlertGuid);
    UIAlert myAlert = this.DataGateway.ExecuteScalar (command);
``` b. Provider

```
[DataCommand (Name = "GetAlert")]
[return:
DataCommandResult (typeof (MonitoringAlertToDataObjectConverter))]
public MonitoringAlert
GetMonitoringAlert ([DataCommandParameter (Name="target")] Guid
AlertId)
{
    MonitoringAlert alert = // Logic to retrieve an alert from
store
    return alert;
}
```

5. Asynchronous Command
a. Client

```
AsyncDataCommand<IDataObject> command = new
AsyncDataCommand<IDataObject> ("AlertProvider.GetAlerts", new
ObservableDataModel( ));
command.CommandCompleted += new
EventHandler<AsyncDataCommandCompletedEventArgs<IEnumerable
<IDataObject>>> (CommandCompleted);
this.DataGateway.ExecuteAsync (command);
void CommandCompleted (object sender,
AsyncDataCommandCompletedEventArgs
<IEnumerable<IDataObject>> e)
{
    // process the data objects returned
}
```

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
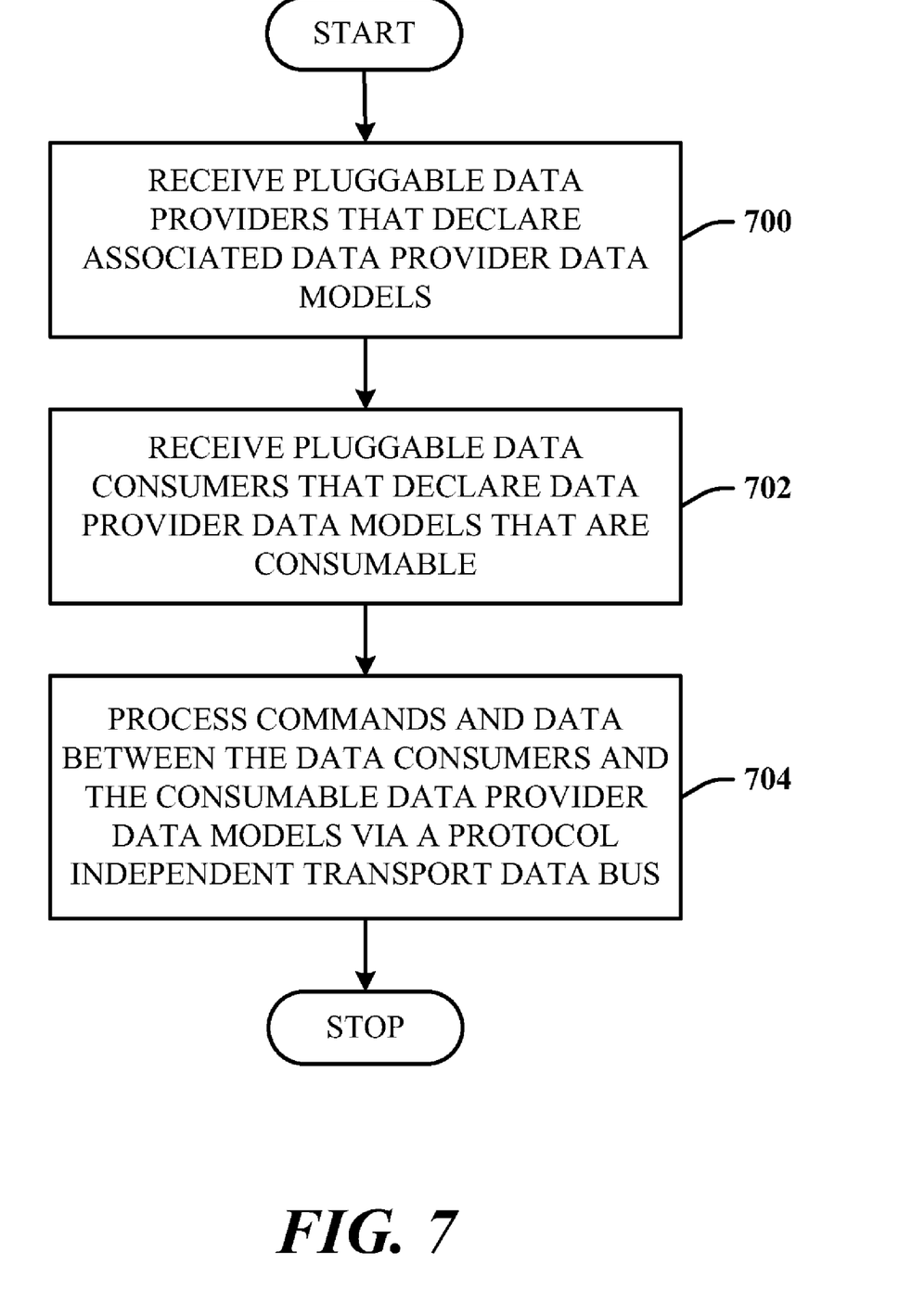
FIG. 7 illustrates a computer-implemented data bus method in accordance with the disclosed architecture.

FIG. 7 illustrates a computer-implemented data bus method in accordance with the disclosed architecture. At 700, pluggable data providers are received that declare associated data provider data models. At 702, pluggable data consumers are received that declare data provider data models that are consumable. At 704, commands and data are processed between the data consumers and the consumable data provider data models via a protocol independent transport data bus.

Figure 8:
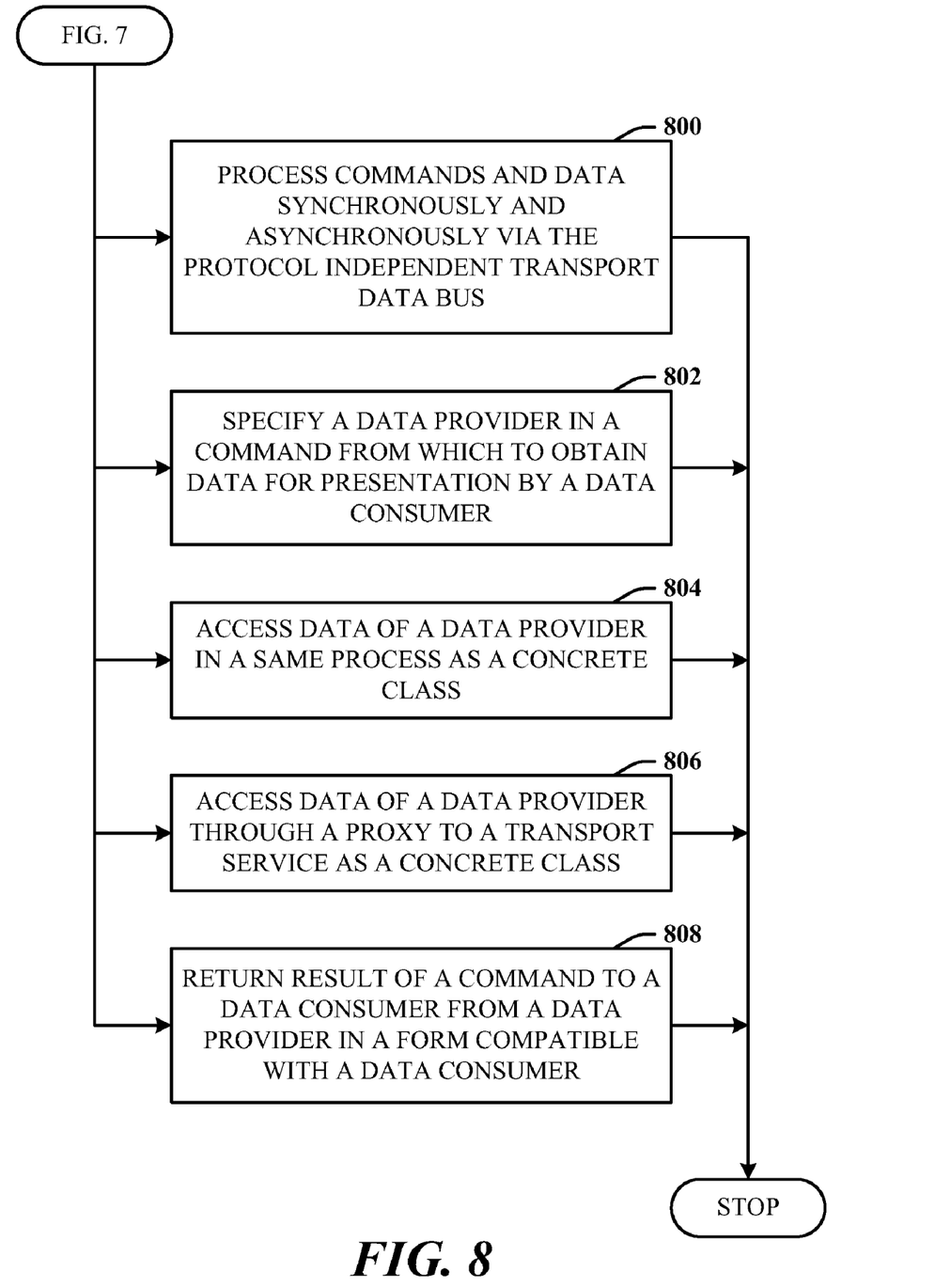
FIG. 8 illustrates further aspects of the method of FIG. 7.

FIG. 8 illustrates further aspects of the method of FIG. 7. At 800, the commands and data are processed synchronously and asynchronously via the protocol independent transport data bus. At 802, a data provider is specified in a command from which to obtain data for presentation by a data consumer. At 804, data of a data provider is accessed in a same process as a concrete class. At 806, data of a data provider is accessed through a proxy to a transport service as a concrete class. At 808, a result of a command is returned to a data consumer from a data provider in a form compatible with a data consumer.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary"

may be used herein to mean serving as an example, instance, or illustration. Any aspect or design described herein as "exemplary" is not necessarily to be construed as preferred or advantageous over other aspects or designs.

Figure 9:
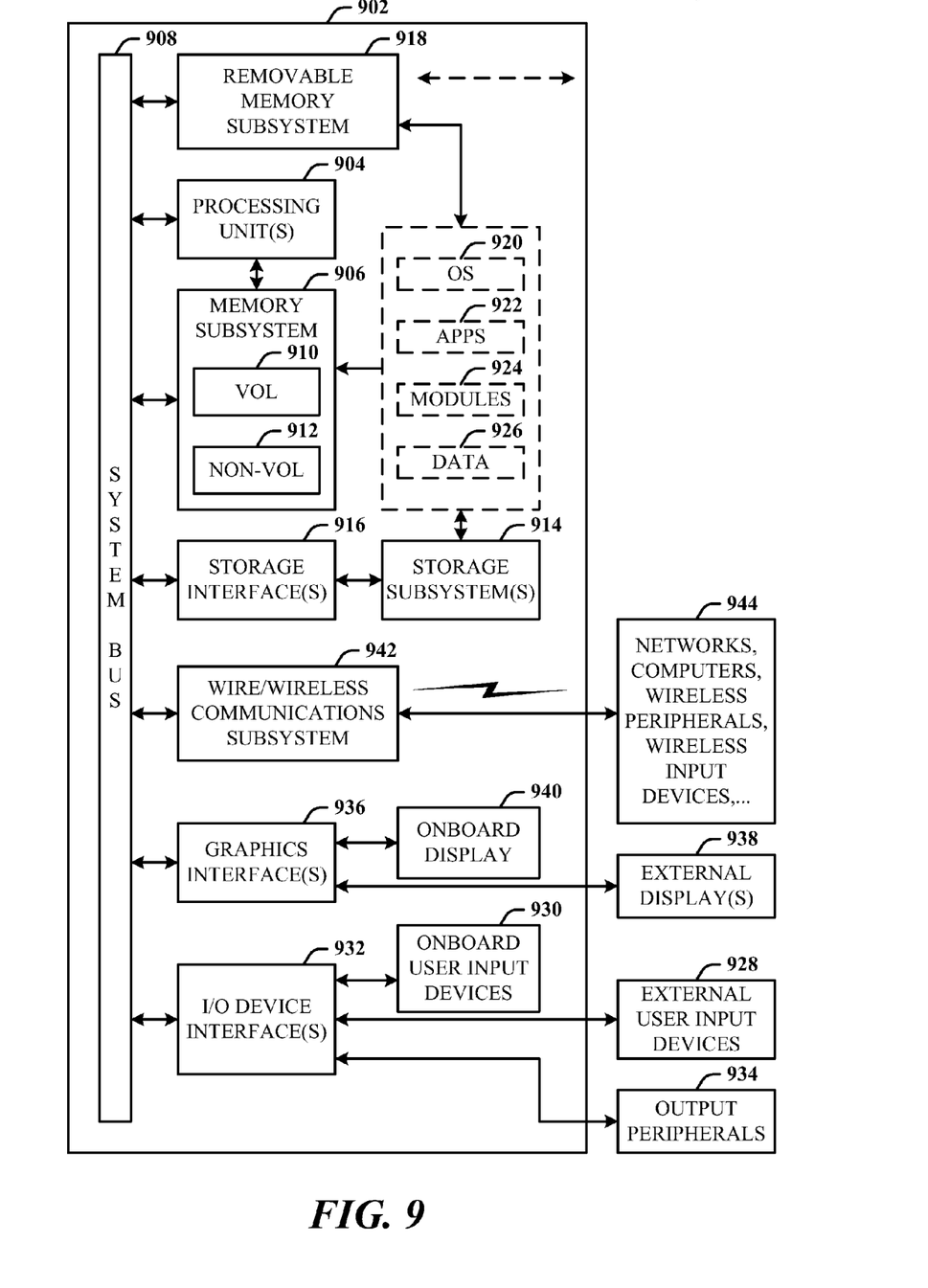
FIG. 9 illustrates a block diagram of a computing system that executes a protocol independent data bus in accordance with the disclosed architecture.

Referring now to FIG. 9, there is illustrated a block diagram of a computing system 900 that executes a protocol independent data bus in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the entities and components of the system 200 of FIG. 2, the object interface 300 of FIG. 3, the type interface 400 of FIG. 4, the model interface 500 of FIG. 5, the gateway interface 600 of FIG. 6, and the methods represented by the flowcharts of FIGS. 7-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data bus system having a physical storage media, comprising:
    consumer logic that declares a data model consumed, that interacts with disparate data providers that declare an associated data model, for processing of provider data therefrom;
    a transport layer interstitial to the consumer logic and the data providers that provides protocol independent services for many-to-many handling of the provider data by the consumer logic, thereby employing codeless, declarative combinations of consumer logic and data providers; and
    a processor that executes computer-executable instructions associated with at least one of the consumer logic or the transport layer.

2. The system of claim 1, wherein the transport layer provides serialization services, transformation services, and transport services that accommodate the disparate data providers.

3. The system of claim 1, wherein the transport layer processes modifications and extensions that are bound at runtime.

4. The system of claim 1, wherein the transport layer accommodates data providers that are both pluggable and declarative of associated data models.

5. The system of claim 1, wherein the transport layer accommodates consumer logic that is both pluggable and declarative of an associated data model.

6. The system of claim 1, wherein the transport layer accommodates declarative consumer logic and data providers.

7. The system of claim 1, wherein the transport layer accommodates data providers that utilize methods having variable signatures.

8. The system of claim 1, wherein the transport layer processes synchronous and asynchronous methods.

9. A computer-implemented data bus system having a physical media, comprising:
    pluggable data providers that declare associated data models;
    pluggable data consumers that declare associated data models for consumption;
    a transport data bus interactively positioned between the pluggable data providers and pluggable data consumers that provides protocol independent services for many-to-many handling of data between the data providers and data consumers, thereby employing codeless, declarative combinations of pluggable data consumers and pluggable data providers; and
    a processor that executes computer-executable instructions associated with at least one of the pluggable data providers, pluggable data consumers, or transport data bus.

10. The system of claim 9, wherein the transport data bus provides serialization services, transformation services, and transport services that accommodate the data providers and data consumers.

11. The system of claim 9, wherein the transport data bus processes modifications and extensions that are bound at runtime.

12. The system of claim 9, wherein the transport data bus interacts with data providers that utilize methods having variable signatures, the methods are synchronous and asynchronous.

13. The system of claim 9, wherein the transport data bus processes a command and command parameters directed from a data consumer that specifies a data provider.

14. The system of claim 9, wherein the transport data bus includes a proxy data gateway and a core data gateway.

15. A computer-implemented data bus method executable via a processor and memory, comprising acts of:
    receiving pluggable data providers that declare associated data provider data models;
    receiving pluggable data consumers that declare data provider data models that are consumable;
    processing commands and data between the data consumers and the consumable data provider data models via a protocol independent transport data bus, thereby employing codeless, declarative combinations of pluggable data providers and pluggable data consumers; and
    utilizing a processor that executes instructions stored in memory to perform at least one of the acts of receiving or processing.

16. The method of claim 15, further comprising processing the commands and data synchronously and asynchronously via the protocol independent transport data bus.

17. The method of claim 15, further comprising specifying a data provider in a command from which to obtain data for presentation by a data consumer.

18. The method of claim 15, further comprising accessing data of a data provider in a same process as a concrete class.

19. The method of claim 15, further comprising accessing data of a data provider through a proxy to a transport service as a concrete class.

20. The method of claim 15, further comprising returning a result of a command to a data consumer from a data provider in a form compatible with a data consumer.

* * * * *